United States Patent
Tertoolen

(10) Patent No.: US 8,756,000 B2
(45) Date of Patent: Jun. 17, 2014

(54) NAVIGATION APPARATUS AND METHOD OF DETECTION THAT A PARKING FACILITY IS SOUGHT

(75) Inventor: Simone Francine Tertoolen, Delft (NL)

(73) Assignee: TomTom International B.V., Amsterdam (NL)

(*) Notice: Subject to any disclaimer, the term of this patent is extended or adjusted under 35 U.S.C. 154(b) by 387 days.

(21) Appl. No.: 12/736,786

(22) PCT Filed: Oct. 9, 2008

(86) PCT No.: PCT/EP2008/063562
§ 371 (c)(1),
(2), (4) Date: Dec. 22, 2010

(87) PCT Pub. No.: WO2009/156000
PCT Pub. Date: Dec. 30, 2009

(65) Prior Publication Data
US 2011/0106426 A1     May 5, 2011

Related U.S. Application Data

(60) Provisional application No. 61/129,413, filed on Jun. 25, 2008.

(51) Int. Cl.
*G01C 21/00*     (2006.01)
(52) U.S. Cl.
USPC ........................................................ 701/400
(58) Field of Classification Search
USPC ................................................................ 701/400
See application file for complete search history.

(56) References Cited

U.S. PATENT DOCUMENTS

| | | |
|---|---|---|
| 5,906,654 A | 5/1999 | Sato |
| 6,265,989 B1 | 7/2001 | Taylor |
| 6,411,895 B1 | 6/2002 | Lau et al. |
| 2003/0216860 A1 | 11/2003 | Shitamatsu et al. |
| 2005/0060073 A1* | 3/2005 | Tanaka et al. ................... 701/36 |
| 2005/0270177 A1* | 12/2005 | Mori et al. ................. 340/932.2 |
| 2007/0027598 A1* | 2/2007 | Mori et al. ....................... 701/41 |
| 2008/0048885 A1 | 2/2008 | Quinn |
| 2009/0259365 A1* | 10/2009 | Rohlfs et al. .................... 701/41 |
| 2010/0259420 A1* | 10/2010 | Von Reyher et al. ...... 340/932.2 |
| 2011/0304477 A1* | 12/2011 | Yoshihashi et al. ........ 340/932.2 |
| 2012/0133767 A1* | 5/2012 | Muramatsu et al. .......... 348/148 |

FOREIGN PATENT DOCUMENTS

| | | |
|---|---|---|
| CN | 1993601 A | 7/2007 |
| EP | 1365213 A1 | 11/2003 |

OTHER PUBLICATIONS

International Preliminary Report on Patentability and Written Opinion for International Patent Application No. PCT/EP2008/063562 dated Jan. 5, 2011.

* cited by examiner

*Primary Examiner* — Hussein A. Elchanti

(57) ABSTRACT

A navigation apparatus is disclosed including a location determination unit and a processing resource arranged to support, when in use, a user interface. In at least one embodiment, the processing resource is operably coupled to the location determination unit in order to obtain location information therefrom. The processing resource is arranged to analyze the location information and the user interface is arranged to generate a message offering assistance in relation to finding a parking facility in response to the processing resource determining that a location information characteristic associated with the location information is in accordance with a predetermined criterion.

24 Claims, 10 Drawing Sheets

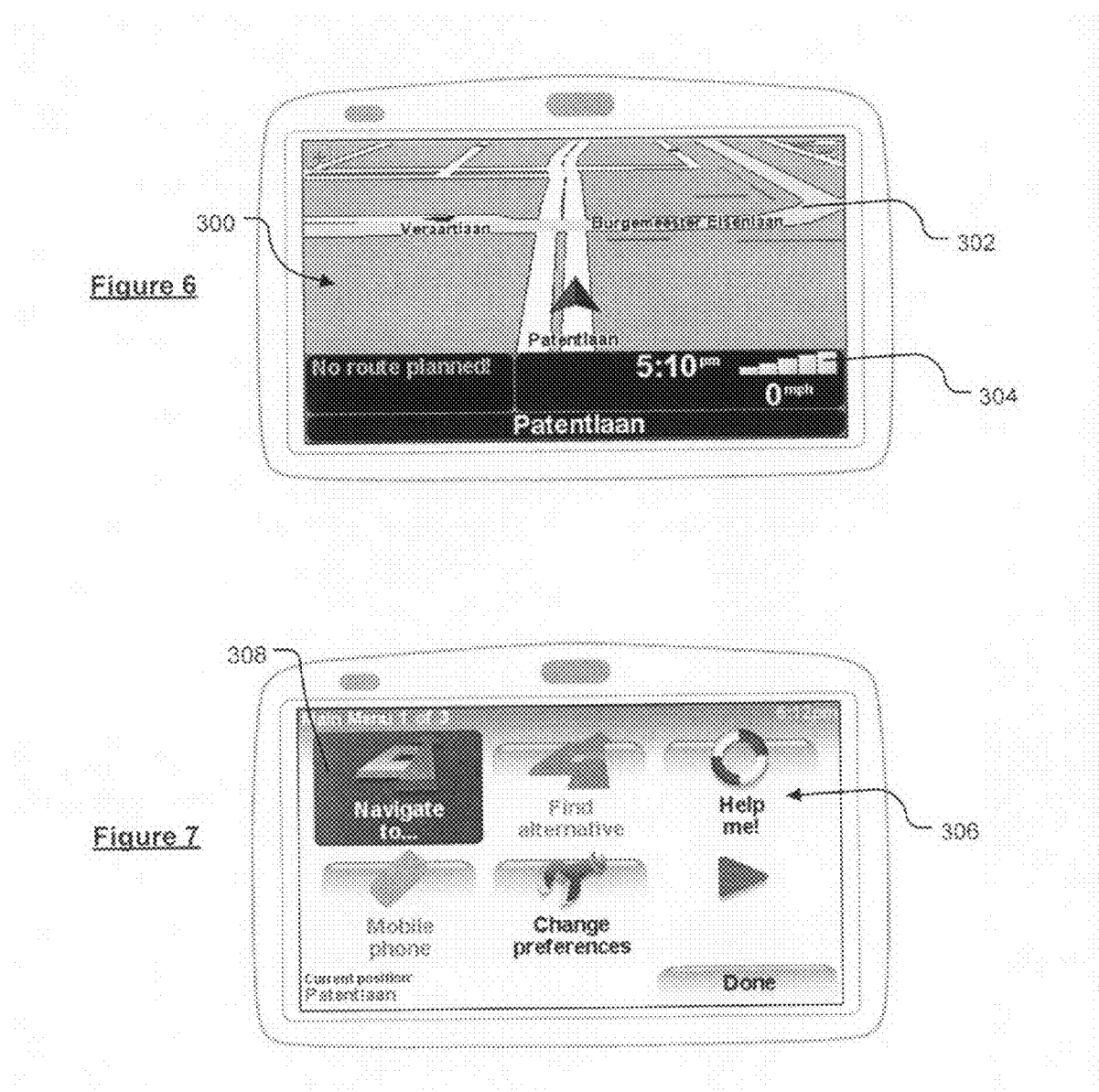

NAVIGATION APPARATUS AND METHOD OF DETECTION THAT A PARKING FACILITY IS SOUGHT

This is a National Phase of PCT Patent Application No. PCT/EP2008/063562, filed on Oct. 9, 2008, which claims priority under 35 U.S.C. §365(c) and 119(e) to U.S. Provisional Application No. 61/129,413, filed on Jun. 25, 2008, the contents of each of which are hereby incorporated herein by reference in their entirety.

FIELD OF THE INVENTION

The present invention relates to a navigation apparatus of the type that, for example, is capable of determining when a parking opportunity is being sought. The present invention also relates to a method of determining that a parking facility is being sought, the method being of the type that, for example, analyses location information in order to infer that the parking facility is being sought.

BACKGROUND OF THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory and map data stored within said memory. The processor and memory cooperate to provide an execution environment in which a software operating system is typically established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favorite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

The device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking), are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria. For example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 930 Traffic model manufactured and supplied by TomTom International B.V., provide a reliable means for enabling users to navigate from one position to another. Such devices are of great utility when the user is not familiar with the route to the destination to which they are navigating.

As indicated above, one or more POIs can be selected by a user of the PND in respect of a journey to be embarked upon or during a journey. To select a POI during a journey, a user typically negotiates a menu structure of a user interface of the PND in order to select a category of POI desired, for example a supermarket or a car park. The application software of the PND then identifies, using locally stored data, a number of POIs of the type selected by the user, for example car parks, and presents the identified car parks to the user via the user interface. To assist the user, the application software typically orders the car parks identified by distance from a current location of the PND and indicates an associated distance value adjacent the car park listed. The user can then select one of the car parks identified by the user interface and other parts of the application software. In response to selection of one of the car parks, the application software either sets the car park selected as a waypoint or an ultimate destination and the PND then calculates a route either via the car park selected or to the car park selected, as appropriate. The selection of the car park as a destination or a waypoint can similarly be made in relation to functionality of the PND to prepare a route or an itinerary. Of course, if the user is already en-route and the PND is already providing navigation assistance, the PND integrates the car park chosen into an existing route calculated, for example by recalculating the existing route to take into account the selection made by the user.

An alternative method also exists to specify the car park as the destination. The alternative method comprises configuring a route using a route configuration procedure of the application software in respect of a destination location and then re-executing the route configuration procedure in order to amend the destination to a POI near the destination location previously set. The selection of the POI near the destination location previously set comprises negotiating a part of a menu structure of the application software in order to select, in this example, car parking as a category of POI.

On the whole, this technique works quite well and provides satisfactory results for the user. However, a disadvantage of these techniques is that a user, wishing to navigate to or via a given destination location, has to negotiate a menu structure and perform a relatively large number of steps in order to obtain navigation assistance to a car park near the destination location. These procedures are therefore more time consuming than a simple route selection procedure where a user simply selects a destination location, and possibly a starting point and/or a waypoint, without negotiating a menu structure dedicated to POI selection. Also, it is not always apparent to a user that a car park near the destination location is required; the user may assume that car parking is provided at the destination location only to find, upon arrival, that a car parking facility is full or does not exist. In some instances, it may simply not occur to the user to plan a seemingly straightforward route down to a level of detail that includes specifying a car park as a destination. In any event, many users of electronic apparatus are not aware of the full extent of services provided by the electronic apparatus. In this respect, navigation apparatus are no different in this regard. Additionally, when navigating to a location selected, the user can be unaware of a car park in the vicinity of the destination location that is of interest or use to the user, resulting in a missed opportunity to navigate to a more convenient or appropriate location. Furthermore, when engaging in so-called "free driving" as mentioned above, no destination location is input into the navigation apparatus, because the navigation apparatus is not providing navigation assistance. Consequently, an opportunity to set a route that specifies a destination location, let alone a car park as a destination location, does not present itself. It may, however, subsequently transpire that when the user reaches an intended destination location of which the navigation apparatus is not advised, the user decides that driving to a parking facility is desired. In such circumstances, the user has to use functionality of the application software that supports navigation to a POI in order to find the car parking facility. To disrupt a free driving session to set a navigation route or to add a navigation route once the free driving session has terminated at the destination location is inconvenient for the user.

SUMMARY OF THE INVENTION

According to a first aspect of the present invention, there is provided a navigation apparatus comprising: a location determination unit; a processing resource arranged to support, when in use, a user interface, the processing resource being operably coupled to the location determination unit in order to obtain location information therefrom; wherein the processing resource is arranged to analyse the location information; and the user interface is arranged to generate a message offering assistance in relation to finding a parking facility in response to the processing resource determining that a location information characteristic associated with the location information is in accordance with a predetermined criterion.

The message may be visual and/or audible.

The predetermined criterion may relate to a driving behaviour. The driving behaviour may relate to at least one parameter associated with driving, for example change of spatial location with time.

The processing resource may be arranged to support a navigation function; the navigation function may be arranged to provide navigation assistance to a selected location.

The processing resource may be arranged to query a database comprising parking facility information in order to find the parking facility; the parking facility may be within a predetermined vicinity of the location selected.

The database may be a points of interest database. The location selected may be a destination location or a waypoint location.

The predetermined criterion is a speed criterion. The speed criterion may be a predetermined maximum speed threshold, for example less than about 10 ms-1, such as less than about 7 ms-1 or less than about 3 ms-1. The speed criterion may be a range of speeds. The predetermined maximum speed threshold may therefore be accompanied by a predetermined minimum speed threshold, for example at least about 1 ms-1 or at least about 2 ms-1.

The predetermined criterion may be a correlation with a predetermined path. The predetermined path may be substantially loop-like. The predetermined path may be substantially a reverse course.

The predetermined criterion may be a proximity threshold with respect to the location selected.

The predetermined criterion may be failure to stop at the selected location for a minimum predetermined period of time.

The predetermined criterion may be movement away from the selected location.

The determination of the characteristic of the at least part of the location information being in accordance with the predetermined criterion may be made upon or after arrival at the selected location.

The parking facility found may be a closest parking facility with respect to the selected location.

The processing resource may be arranged to support generation of the message when navigation assistance is not being provided.

The navigation apparatus may be arranged to support a free driving mode of operation.

The processing resource may be arranged to query a database comprising parking facility information in order to find the parking facility; the parking facility may be within a predetermined vicinity of a current location.

The database of parking facility information may comprise data identifying a location of the parking facility.

The user interface may be arranged to await a response from a user following generation of the message, and the processing resource may be arranged to record the response when the response is indicative of a declination of the offer of assistance for preventing the message being repeated.

The user interface may be arranged to generate the message in response to the processing resource determining that at least two location information characteristics associated with the location information are respectively in accordance with at least two predetermined criteria; the at least two predetermined criteria may comprise the predetermined criterion.

The at least two predetermined criteria may relate to one or more driving behaviours.

The processing resource may be arranged to support a navigation function; the user interface may be arranged to receive a user response to the message accepting the offer of assistance; and the processing resource may be arranged to initiate a route configuration procedure in response to the user response.

The processing resource may be arranged to provide navigation assistance to the parking facility found.

The processing resource may be arranged to calculate a route to the parking facility found following performance of the route configuration procedure.

According to a second aspect of the present invention, there is provided a portable navigation device comprising the navigation apparatus as set forth above in relation to the first aspect of the invention.

According to a third aspect of the present invention, there is provided a method of determination that a parking facility is being sought, the method comprising: obtaining location information from a location determination unit; analysing the location information; determining whether a characteristic of at least part of the location information is in accordance with a predetermined criterion; and a user interface generating a message offering assistance in relation to finding a parking facility in response to a determination that the characteristic of the at least part of the location information is in accordance with the predetermined criterion.

According to a fourth aspect of the present invention, there is provided a method of modifying a route being used by a navigation apparatus to provide navigation assistance, the method comprising the method of determining that a parking facility is being sought as set forth above in relation to the third aspect of the invention.

According to a fifth aspect of the present invention, there is provided a computer program element comprising computer program code means to make a computer execute the method as set forth above in relation to the third or fourth aspects of the invention.

The computer program element may be embodied on a computer readable medium.

Advantages of these embodiments are set out hereafter, and further details and features of each of these embodiments are defined in the accompanying dependent claims and elsewhere in the following detailed description.

It is thus possible to provide a navigation apparatus and a method of detection that a parking facility is sought that obviates the need for a user to perform a dedicated search for a POI, thereby simplifying user interface interaction. The provision of an indication of the parking facility within the predetermined vicinity of the location selected reduces the number of gestures required from a user in order to select the parking facility. In this respect, the user is provided with a mechanism for selecting the parking facility that is more convenient than having specifically to negotiate a part of the user interface provided for POI selection. User interface interaction time is thus reduced. The apparatus and method also enable a user to have an overview in relation to the surroundings of the location selected. In relation to parking facilities, the identification of a parking facility near the location selected saves the user time seeking the parking facility or another, less optimum, parking facility within the vicinity of the location selected. Also, temptation to park illegally is reduced. The apparatus and method thus provide an improved user experience in relation to the navigation apparatus, as well as the possibility of saving the user time, money and inconvenience.

BRIEF DESCRIPTION OF THE DRAWINGS

At least one embodiment of the invention will now be described, by way of example only, with reference to the accompanying drawings, in which:

FIGS. 6 to 14 are screen shots from the navigation apparatus of FIG. 2 during performance of the method of FIG. 5;

DETAILED DESCRIPTION OF PREFERRED EMBODIMENTS

Figure 1:
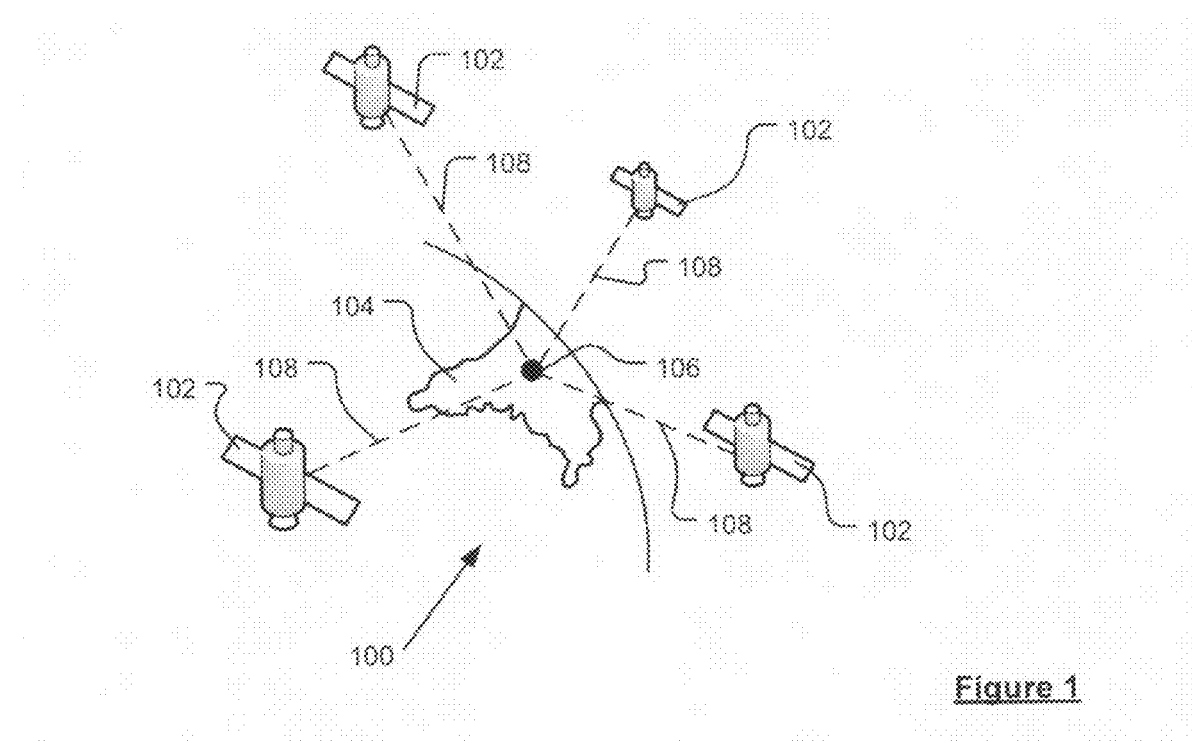
FIG. 1 is a schematic illustration of an exemplary part of a Global Positioning System (GPS) usable by a navigation apparatus constituting an embodiment of the invention.

Throughout the following description identical reference numerals will be used to identify like parts.

One or more embodiments of the present invention will now be described with particular reference to a navigation apparatus. It should be remembered, however, that the teachings herein are not limited to navigation apparatus, for example PNDs, but are instead universally applicable to any type of processing device that is configured to execute navigation software in a portable and/or mobile manner so as to provide route planning and navigation functionality. It follows therefore that in the context of the embodiments set forth herein, a navigation apparatus is intended to include (without limitation) any type of route planning and navigation apparatus, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

It should be appreciated that, in some circumstances, the "destination" location selected by a user need not have a corresponding start location from which the user wishes to start navigating, and as a consequence references herein to the "destination" location or indeed to a "destination" view should not be interpreted to mean that the generation of an initial route is essential, that travelling to the "destination" must occur, or indeed that the presence of a destination requires the designation of a corresponding start location.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

In this example, the navigation apparatus 200 is a Bluetooth enabled navigation apparatus in order that the navigation apparatus 200 can be agnostic to the settings of a wireless communications terminal with which the navigation apparatus 200 can communicate, thereby enabling the navigation apparatus 200 to operate correctly with the ever changing spectrum of mobile telephone models, manufacturers, etc. Model/manufacturer specific settings may, for example, be stored on the navigation apparatus 200. The data stored for this information can be updated.

Although not shown, instead of requiring the wireless communications terminal to provide access to the communications network, the navigation apparatus 200 can, of course, comprise mobile telephone technology, including an antenna, for example, or optionally using an internal antenna of the navigation apparatus 200. The mobile telephone technology within the navigation apparatus 200 can also include an insertable card (e.g. Subscriber Identity Module (SIM) card). As such, mobile telephone technology within the navigation apparatus 200 can be used to establish a network connection between the navigation apparatus 200 and a server (not shown), via the Internet for example, in a manner similar to that of any wireless communications-enabled terminal.

Software stored in server memory provides instructions for a processor of the server to allow the server to provide services to the navigation apparatus 200. One service provided by the server can involve processing requests from the navigation apparatus 200 and transmitting navigation data to the navigation apparatus 200. Another service that can be provided by the server includes processing the navigation data using various algorithms for a desired application and sending the results of these calculations to the navigation apparatus 200.

The establishing of the network connection between the mobile device (via a service provider) and another device such as the server, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the internet connection may be utilised, which can be achieved via a data connection using the mobile telephone or mobile telephone technology.

Alternatively, a personal computer may be connected between the navigation apparatus 200 and the server to establish an internet connection between the server and the navigation apparatus 200.

The navigation apparatus 200 can be provided with information from the server via information downloads which can be periodically updated automatically or upon a user connecting the navigation apparatus 200 to the server and/or can be more dynamic upon a more constant or frequent connection being made between the server and navigation apparatus 200 via a wireless mobile connection device and TCP/IP connection for example. For many dynamic calculations, the processor of the server can be used to handle the bulk of processing needs, however, a processor of the navigation apparatus 200 can also handle much processing and calculation, oftentimes independent of a connection to the server.

Figure 2:
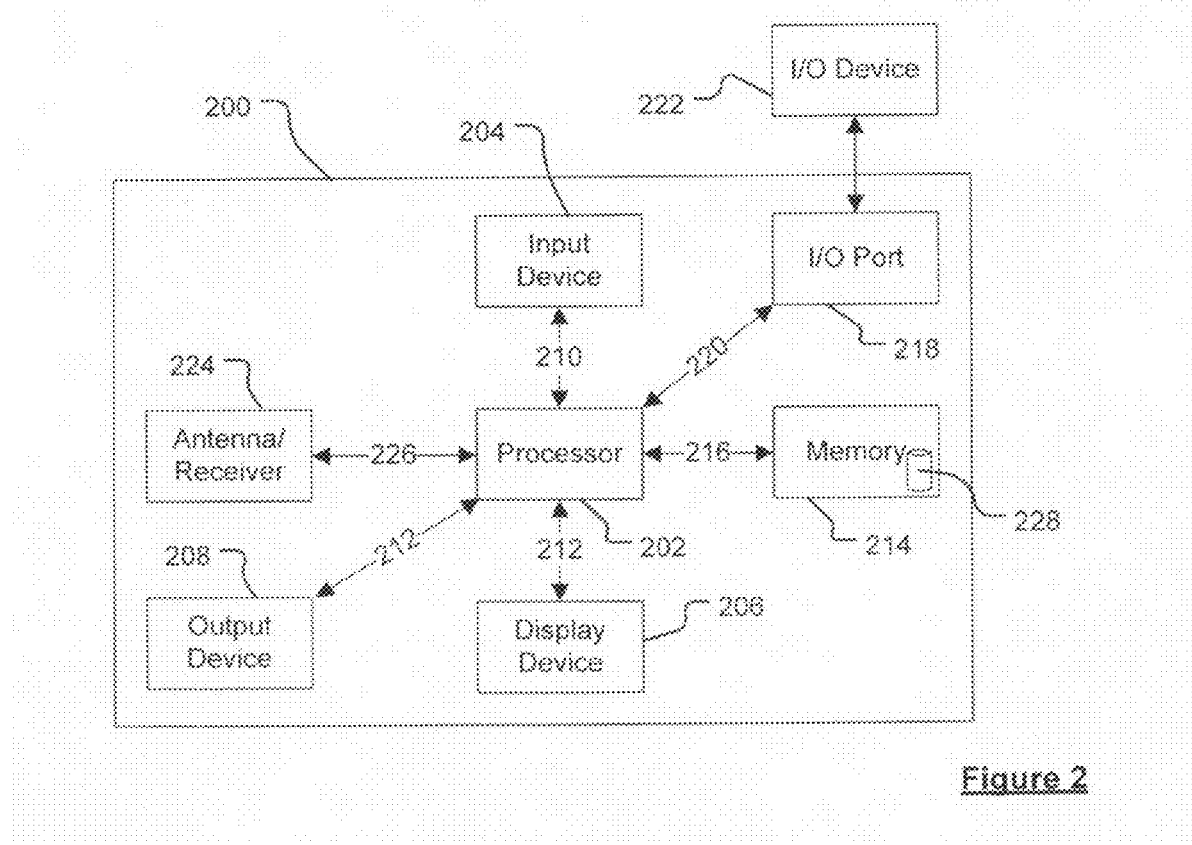
FIG. 2 is a schematic illustration of electronic components of the navigation apparatus of FIG. 1 or any other suitable navigation apparatus.

Referring to FIG. 2, it should be noted that the block diagram of the navigation apparatus 200 is not inclusive of all components of the navigation apparatus, but is only representative of many example components. The navigation apparatus 200 is located within a housing (not shown). The navigation apparatus 200 includes a processing resource comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 3) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation apparatus 200, the processor 202 is operatively connected to and capable of receiving input information from input device 204 via a connection 210, and operatively connected to at least one of the display screen 206 and the output device 208, via respective output connections 212, to output information thereto. The navigation apparatus 200 may include an output device 208, for example an audible output device (e.g. a loudspeaker). As the output device 208 can produce audible information for a user of the navigation apparatus 200, it is should equally be understood that input device 204 can include a microphone and software for receiving input voice commands as well. Further, the navigation apparatus 200 can also include any additional input device 204 and/or any additional output device, such as audio input/output devices for example. The processor 202 is operatively connected to memory 214 via connection 216, the memory 214 comprising, for example, a digital memory for storing, inter alia, a database of information concerning parking facilities, for example a POI database 228 comprising details concerning identities and locations of POIs of differing categories, for example shops, museums and parking facilities. The database can contain, for example identities of parking facilities and location data associated therewith. The processor 202 is further adapted to receive/send information from/to input/output (I/O) ports 218 via connection 220, wherein the I/O port 218 is connectible to an I/O device 222 external to the navigation apparatus 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish the data connection between the navigation apparatus 200 and the server 150 via the Internet or any other network for example.

FIG. 2 further illustrates an operative connection between the processor 202 and an antenna/receiver 224 via connection 226, wherein the antenna/receiver 224 can be a GPS antenna/receiver, for example, and constitutes a location determination unit. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 2 are powered by one or more power sources (not shown) in a conventional manner. As will be understood by one of ordinary skill in the art, different configurations of the components shown in FIG. 2 are contemplated. For example, the components shown in FIG. 2 can be in communication with one another via wired and/or wireless connections and the like. Thus, the navigation apparatus 200 described herein can be a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
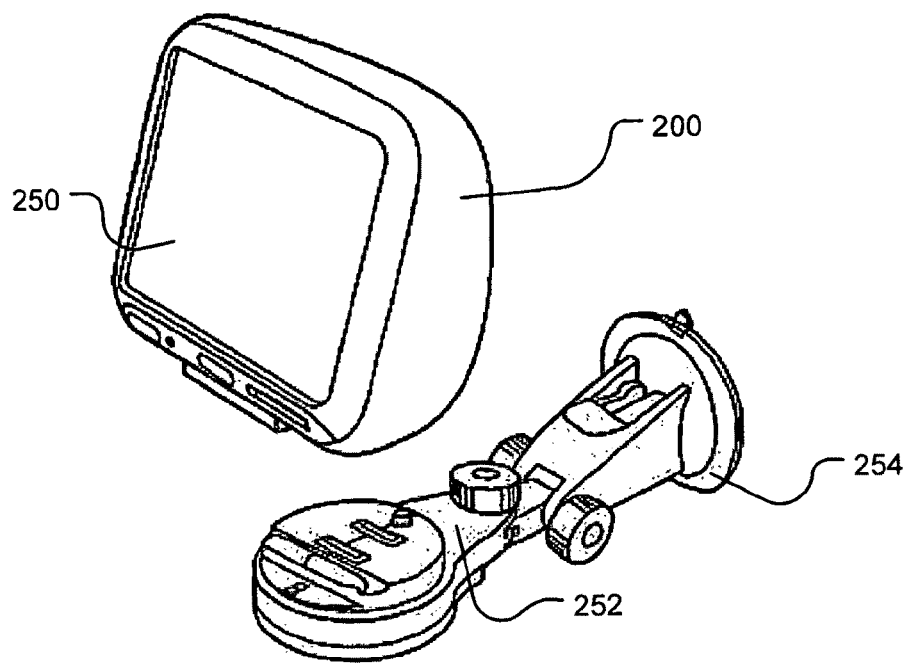
FIG. 3 is a schematic diagram of an arrangement of mounting and/or docking a navigation apparatus.

Referring to FIG. 3, the navigation apparatus 200 can be a unit that includes the integrated input and display device 206 and the other components of FIG. 2 (including, but not limited to, the internal GPS receiver 224, the microprocessor 202, a power supply (not shown), memory systems 214, etc.).

The navigation apparatus 200 can sit on an arm 252, which itself can be secured to a vehicle dashboard/window/etc. using a suction cup 254. This arm 252 is one example of a docking station to which the navigation apparatus 200 can be docked. The navigation apparatus 200 can be docked or otherwise connected to the arm 252 of the docking station by snap connecting the navigation apparatus 200 to the arm 252 for example. The navigation apparatus 200 can then be rotatable on the arm 252. To release the connection between the navigation apparatus 200 and the docking station, a button (not shown) on the navigation apparatus 200 can be pressed, for example. Other equally suitable arrangements for coupling and decoupling the navigation apparatus 200 to a docking station are well known to persons of ordinary skill in the art.

Figure 4:
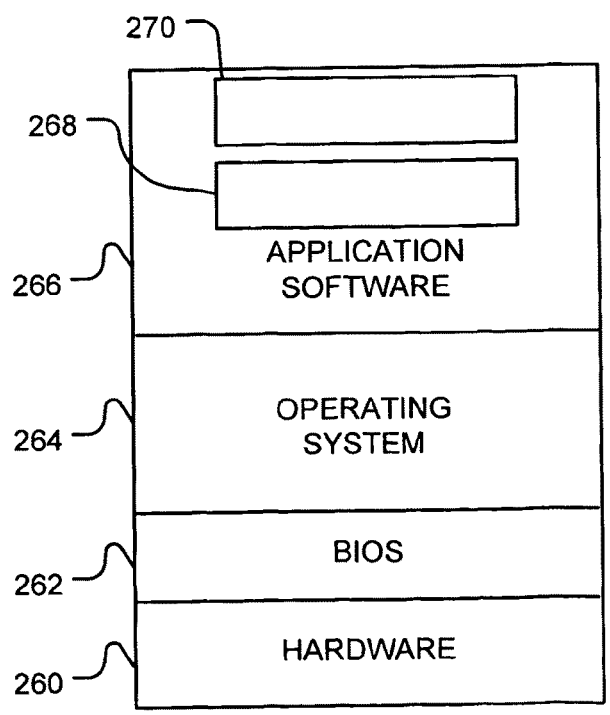
FIG. 4 is a schematic representation of an architectural stack employed by the navigation apparatus of FIG. 2.

Turning to FIG. 4, the processor 202 and memory 214 cooperate to support a BIOS (Basic Input/Output System) 262 that functions as an interface between functional hardware components 260 of the navigation apparatus 200 and the software executed by the device. The processor 202 then loads an operating system 264 from the memory 214, which provides an environment in which application software 266 (implementing some or all of the above described route planning and navigation functionality) can run. The application software 266 provides an operational environment, including the user interface, which supports core functions of the navigation apparatus 200, for example map viewing, route planning, navigation functions and any other functions associated therewith, including a method of detection that a parking facility is sought as set out below. In this respect, part of the user interface comprises a view generation engine 268. The application software 266 also supports a driving pattern monitoring module 270.

Operation of the above navigation apparatus 200 will now therefore be described in the context of a user of the navigation apparatus 200 wishing to travel between two locations in The Netherlands. However, the skilled person should appreciate that other equally applicable examples are conceivable and the choice of locations is not intended to be limiting.

Figure 5:
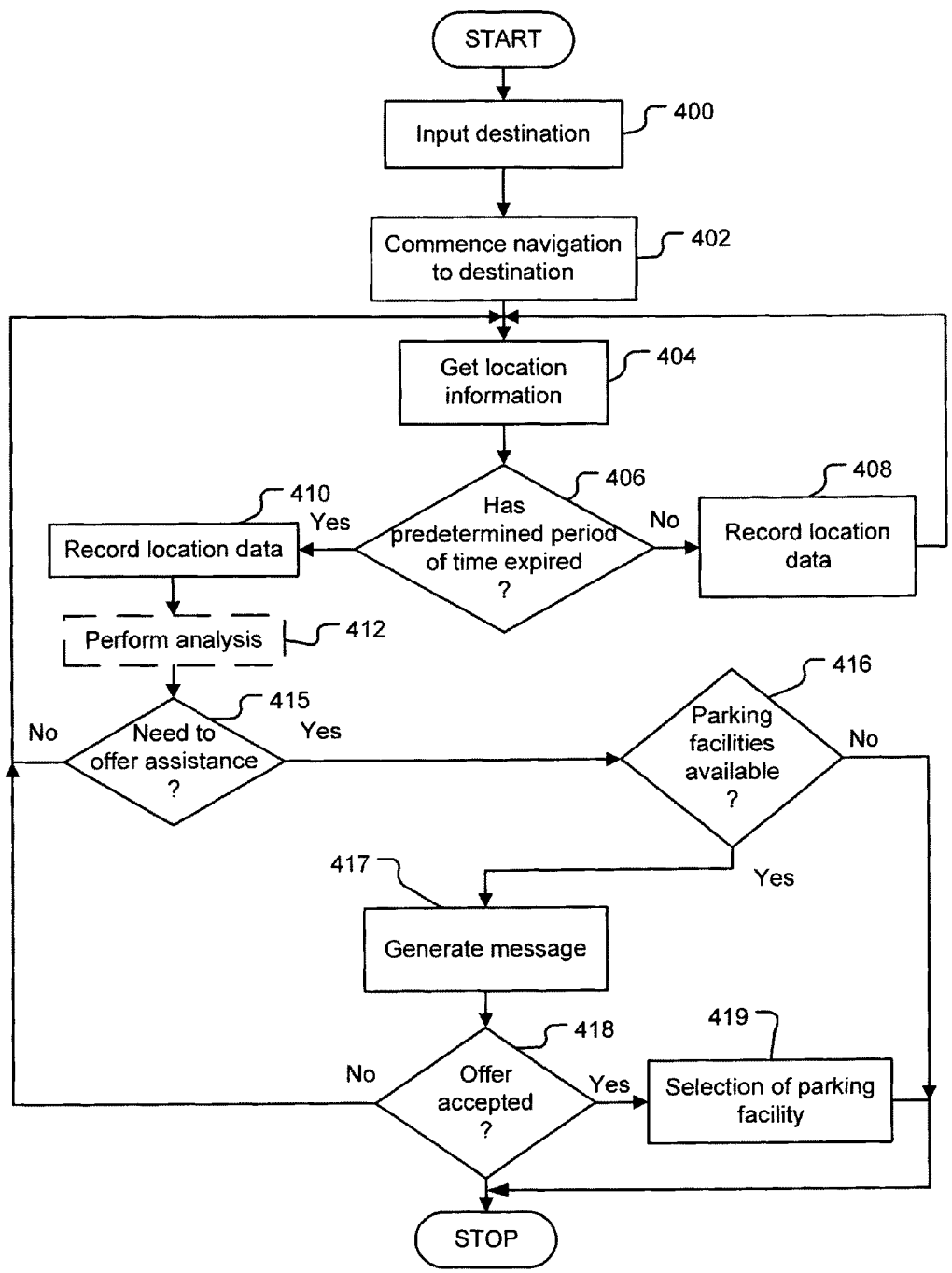
FIG. 5 is flow diagram of a method of determining that a parking facility is being sought used by the navigation apparatus of FIG. 2 and constituting an embodiment of the invention.

In operation (FIG. 5), the user, a visitor to the offices of the European Patent Office in The Hague, located at Patentlaan 2, Rijswijk, requires navigation assistance to the offices of TomTom International BV located at Rembrandtplein 35, Amsterdam.

In order to implement navigation to the above destination using the navigation apparatus 200, the user configures a route for calculation as follows. Referring to FIGS. 6 to 14, the user undertakes (Step 400) an illustrative destination location input process described hereinbelow using a location browser function supported by the user interface. Although not shown, the user uses a settings menu option supported by the application software 266 in order to select view generation in a three-dimensional mode.

When the user powers-up the navigation apparatus 200, the apparatus 200 acquires GPS data and performs a self-location determination by calculating (in a known manner) the current location of the navigation apparatus 200. The user is then presented, as shown in FIG. 6, with a display 300 showing in pseudo three-dimensions: a local environment 302 in which the navigation apparatus 200 is determined to be located and, in a region 304 of the display 300 below the local environment 302, a set of control and status messages.

By touching the display at the local environment 302, the navigation apparatus 200, through the user interface, updates the display 300 by displaying (as shown in FIG. 7) a series of virtual or soft buttons 306 by means of which the user can, inter alia, input a destination to which the user wishes to navigate.

Figure 8:
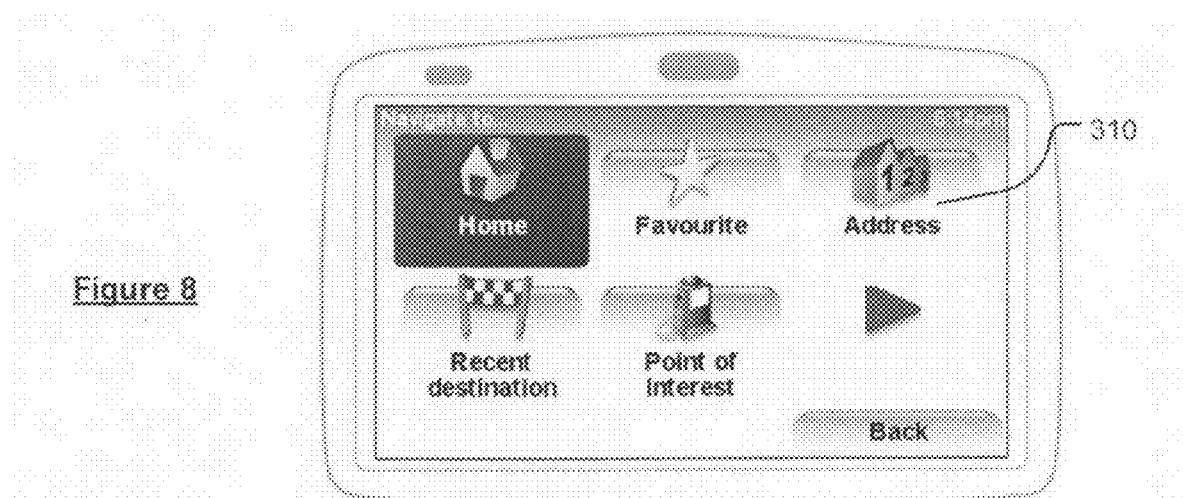

By touching the "Navigate to" virtual button 308, the navigation apparatus 200 initiates a route calculation procedure, a part of which comprises a route creation procedure. In accordance with the route creation procedure, the navigation apparatus 200 displays (as shown in FIG. 8) a plurality of virtual buttons that are each associated with a different category of selectable destinations. In this instance, the display shows a "home" button that if pressed would set the destination to a stored home location. The "favorite" button, if pressed, reveals a list of destinations that the user has previously stored in the navigation apparatus 200 and if one of these destinations is then selected the destination for the route to be calculated is set to the selected previously stored destination. The "recent destination" soft button, if pressed, reveals a list of selectable destinations held in the memory of the navigation apparatus 200 and to which the user has recently navigated. Selection of one of the destinations populating this list would set the destination location for this route to the selected (previously visited) location. The "point of interest" button, if pressed, reveals a number of options by means of which a user can opt to navigate to any of a plurality of locations, such as Automatic Teller Machines (ATMs), petrol stations or tourist attractions for example, that have been pre-stored in the navigation apparatus 200 as locations to which a user of the navigation apparatus 200 might want to navigate to. A triangular "arrow" shaped virtual button provides access to additional sub-menu options relating to the "Navigate to . . . " menu option, and an "address" button 310 commences a process by which the user can input the street address of the destination to which the user wishes to navigate.

Figure 9:
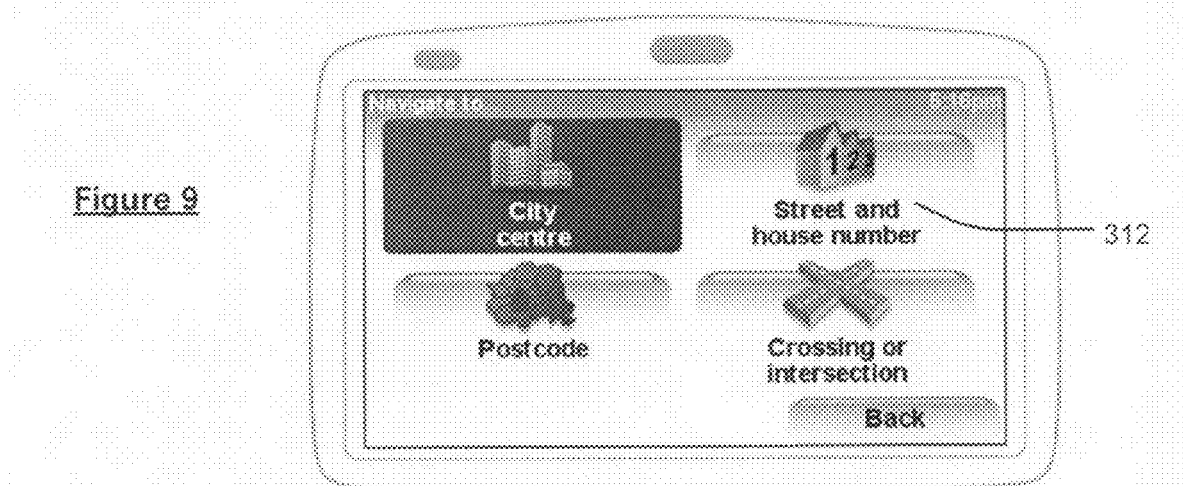

Since the user, in this example, knows the street address of the destination to which the user wishes the navigation apparatus 200 to navigate, it is assumed that the "address" button 310 is operated (by touching the button displayed on the touchscreen) in order to select a location as the destination, whereupon (as shown in FIG. 9) the user is presented with a series of address input options: address input by "city centre", by "postcode", by "crossing or intersection" (for example a junction of two roads) and by "street and house number".

Figure 10:

In this example, the user knows the street address and house number of the destination and hence selects a "street and house number" virtual button 312 whereupon the user is then presented, as shown in FIG. 10, with: a prompt 314 to enter the name of the city to which they wish to navigate, a flag button 316 by means of which the user can select the country in which the desired city is located, and a virtual keyboard 318 that may be operated by the user, if necessary, to input the name of the destination city. In this instance the user begins to type the word "Amsterdam" and the navigation apparatus 200 therefore responds by providing the user with a list 320 of selectable cites.

Figure 11:
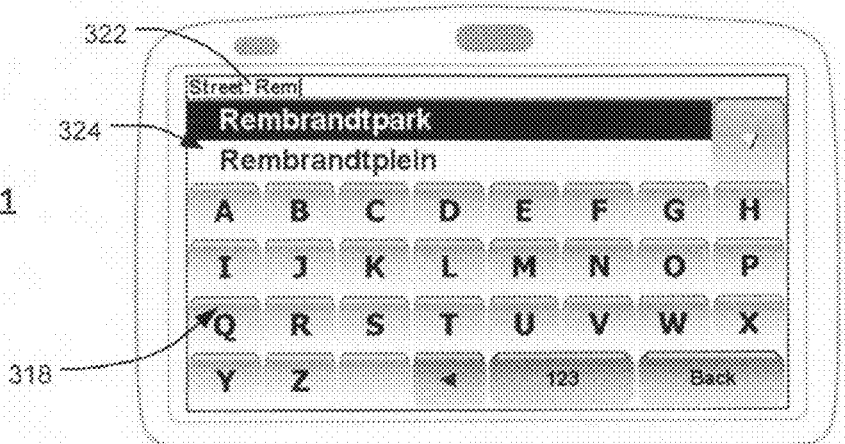
Figure 12:
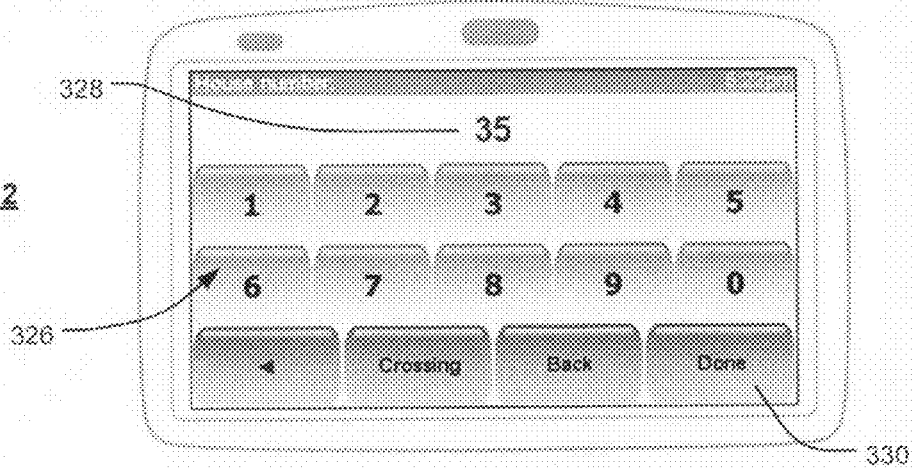
Figure 13:
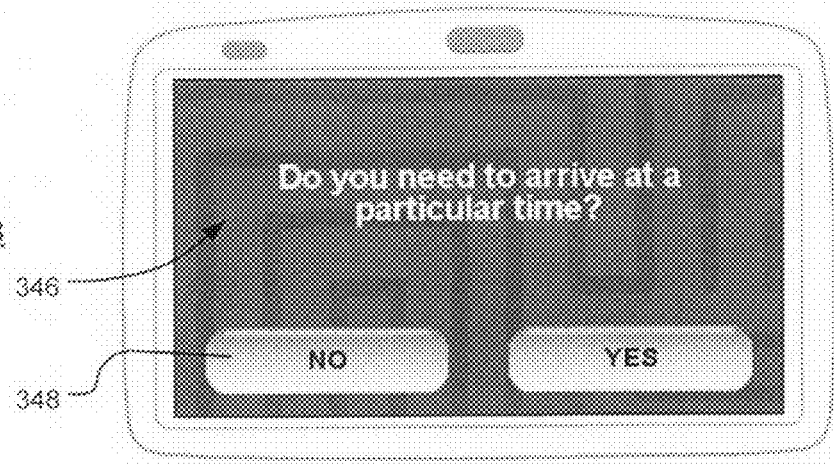

The user in this instance wishes to navigate to Amsterdam, and on selection of Amsterdam from the list 320 the navigation apparatus 200 displays, as shown in FIG. 11, the virtual keyboard 318 again by means of which the user can input street names, a prompt 322 for entry of a street name. In this instance, the user begins to type the name of the street in which the destination is located and the navigation apparatus 200 responds by providing the user with a list 324 of selectable street names.

In this example, the user wishes to travel to the street Rembrandtplein and so the user selects "Rembrandtplein" from the displayed list 324.

Once a street has been selected, the navigation apparatus 200 then displays (FIG. 12) a restricted, largely numeric, virtual keypad 326 and prompts the user, by means of prompt 328, to enter the street number in the selected street and city to which the user wishes to navigate. If the user has previously navigated to a building number in this street, then that number is initially shown. If, as in this instance, the user wishes to navigate to No. 35, Rembrandtplein, then the user simply needs to type the street number ("35") using the virtual keypad 326 and then touch a "done" virtual button 330 displayed at the bottom right hand corner of the display 300. If the user should wish to navigate to a different building number in Rembrandtplein, then all the user needs do is operate the virtual keypad 326 to input an appropriate building or street number.

In the event that the user decides that navigation to the building number suggested is required, the user touches the "Done" virtual button 330. The application software 266 then causes the user interface to present an interrogation message 346 (FIG. 13) asking the user whether a particular arrival time is required. If the user should touch a "yes" virtual button, then functionality is invoked that estimates the time required to travel to the destination (after provision by the user of the desired arrival time) and advises the user when they should leave (or if they are running late, should have left) their current location in order to arrive at their destination on time. In this instance, the user is not concerned about arriving at a particular time and hence selects a "no" virtual button 348.

Figure 14:
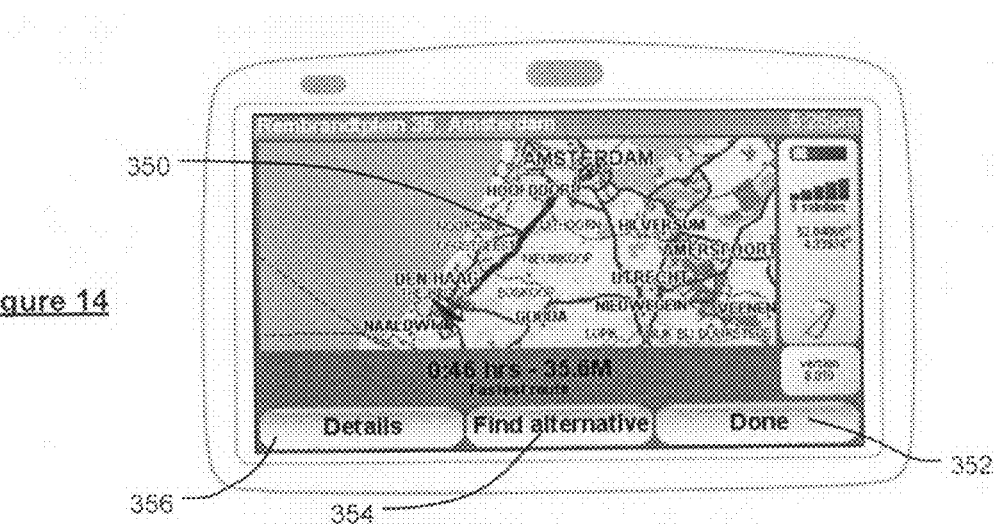

Selecting the "no" virtual button 348 causes the navigation apparatus 200 to calculate a route between the current location and the selected destination, and to display a route 350 calculated, as shown in FIG. 14, on a relatively low magnification map that shows the entire route. The user is also provided with a "done" virtual button 352 which the user can press to indicate the calculated route is acceptable, a "find alternative" virtual button 354 that the user can press to cause the navigation apparatus 200 to calculate another route to the selected destination, and a "details" virtual button 356 that a user can press to reveal selectable options for the display of more detailed information concerning the currently displayed route 350.

In this instance, it is assumed that the user considers the displayed route acceptable, and once the "done" button 352 has been pressed the user is presented, with a three-dimensional view (not shown) of the current, start, location for the navigation apparatus 200.

The user then commences (Step 402) their journey and the navigation apparatus 200 guides the user. The navigation apparatus 200 periodically acquires (Step 404) GPS data and performs a self-location determination by calculating (in a known manner) the current location of the navigation apparatus 200. Using the current location information calculated, the navigation apparatus 200, in a known manner, updates the map in accordance with determined changes in location of the navigation apparatus 200, and guides the user by providing visual and, optionally, audible navigation instructions until the destination selected is approaching or reached as will now be explained in greater detail below.

Referring back to FIG. 5, the navigation apparatus 200 periodically calculates the current location thereof (Step 404) as mentioned above. The driving pattern monitoring module 270 monitors (Step 406) an elapse of time, for example, a period of 15 seconds, and if a predetermined period of time has not yet passed, the current location of the navigation apparatus 200 is recorded (Step 408) in the digital memory of the navigation apparatus 200 and a succeeding location fix is obtained and the above-mentioned process of evaluating the elapse of the predetermined period of time and recordal of the current location data (Step 406, 408) is repeated until the predetermined period of time has elapsed.

Thereafter, the current location information most recently obtained is again stored (Step 410) in the digital memory of the navigation apparatus 200. The driving pattern monitoring module 270 then performs (Step 412) one of more of the following analyses in respect of one or more characteristics associated with the location information as will be described below in relation to FIGS. 15 to 18. In this respect, the location information is current location information and/or historical location information. Furthermore, analysis need not be performed in respect of all data collected and the skilled person should appreciate that, where appropriate, part of the location information need only be analysed. Each analysis described hereinbelow constitutes a determination as to whether at least one characteristic of the location information is respectively in accordance with at least one predetermined criterion, for example: speed, distance, direction of travel, current location and/or path followed.

In order to determine whether the user is in need of a parking facility, the driving pattern monitoring module 270 is arranged to monitor driving behaviour, for example by examining a change of spatial location of a vehicle in or on which the navigation apparatus 200 is disposed, such as with time. Hence, at least one parameter associated with driving is analysed.

Figure 15:
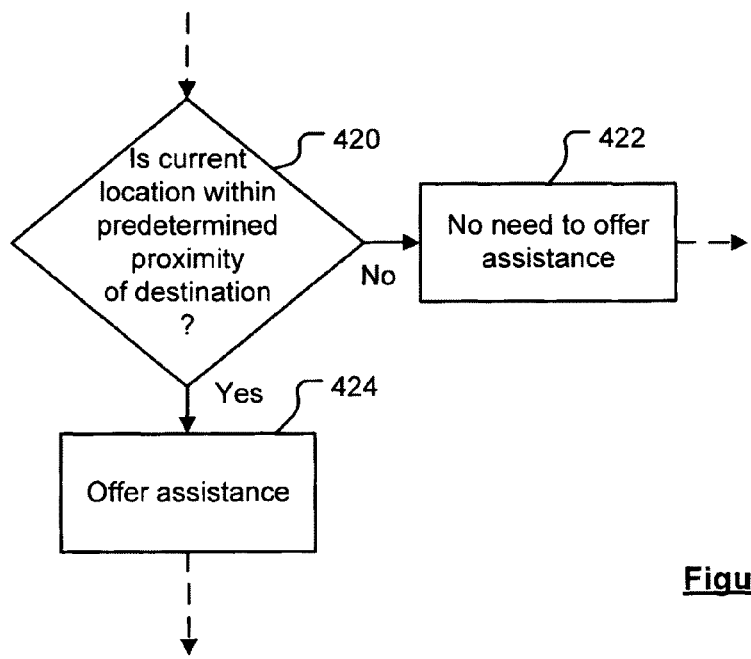
FIG. 15 is a flow diagram of a method of analysis used in the method of FIG. 5 and constituting another embodiment of the invention.

Turning to FIG. 15, the driving pattern monitoring module 270 determines (Step 420) whether the current location of the navigation apparatus 200 is within a predetermined proximity of the destination selected, in this example Rembrandtplein, 35. The predetermined distance can be any suitable distance, for example about 1 km, about 1.5 km or more. If the driving pattern monitoring module 270 determines that the current location of the navigation apparatus 200 is not within the predetermined proximity, then the driving pattern monitoring module 270 assumes (Step 422) that there is no need to offer assistance to navigate to a parking facility, because the navigation apparatus 200 is not sufficiently close to the destination selected. Otherwise, the driving pattern monitoring module 270 assumes (Step 424) that assistance in identifying a parking facility and, optionally, navigating to the parking facility is possibly required.

However, the above-described analysis is not the only analysis that can be performed when assessing the driving behaviour of the user of the navigation apparatus 200 and other assessments can additionally, or alternatively, be performed.

Figure 16:
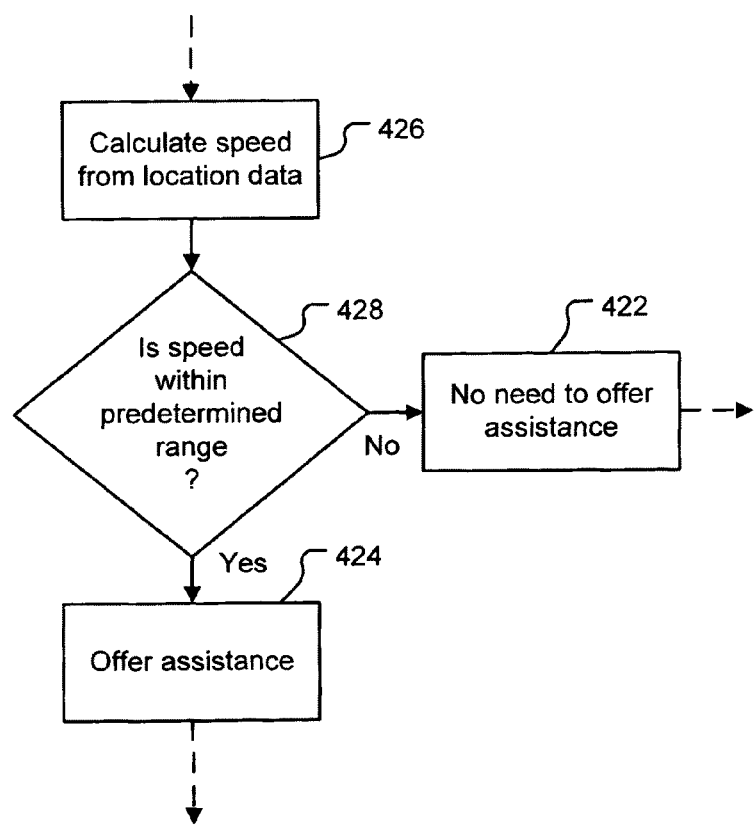
FIG. 16 is a flow diagram of another method of analysis used in the method of FIG. 5 and constituting yet another embodiment of the invention.
Figure 17:
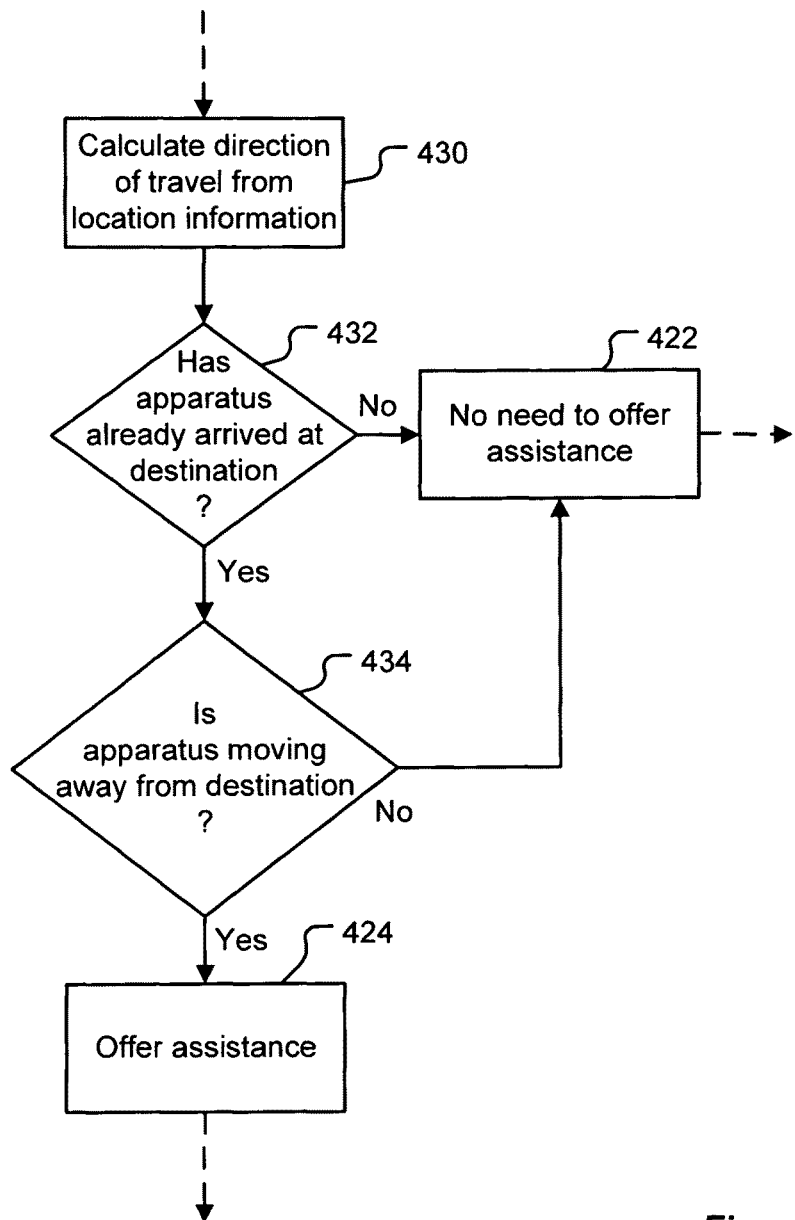
FIG. 17 is a flow diagram of a further method of analysis used in the method of FIG. 5 and constituting a further embodiment of the invention.
Figure 18:
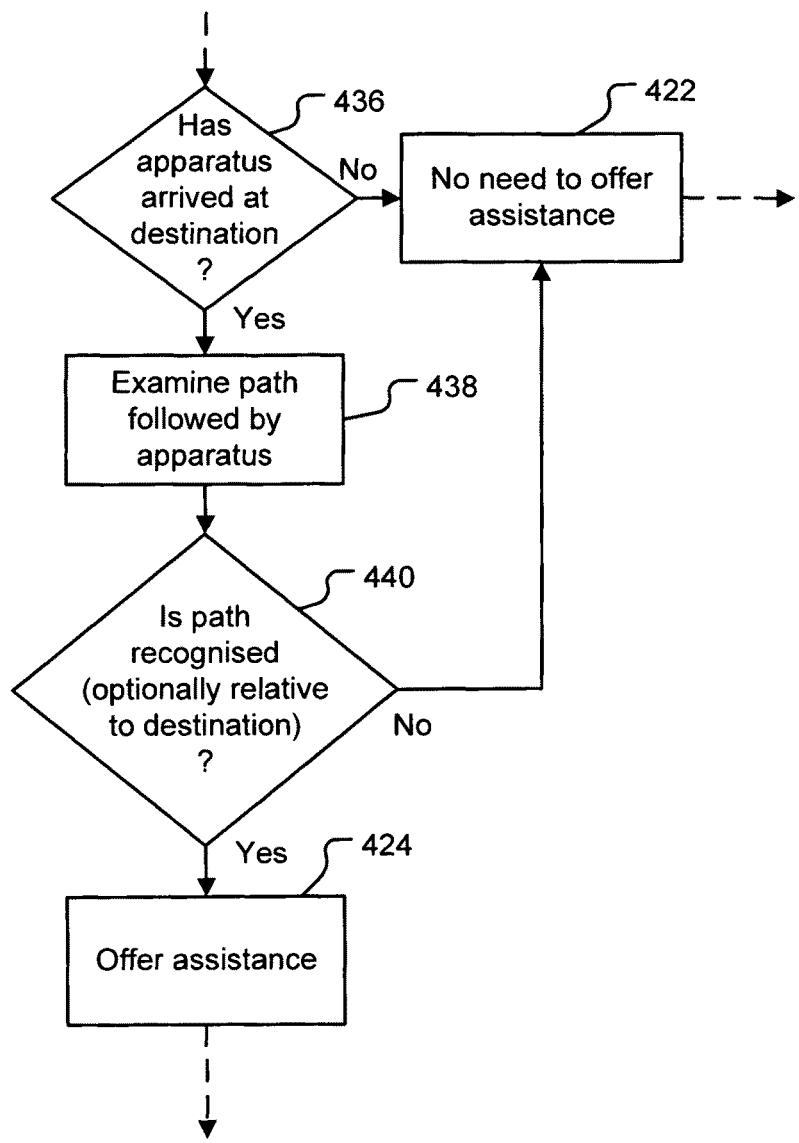
FIG. 18 is a flow diagram of yet a further method of analysis used in the method of FIG. 5 and constituting yet a further embodiment of the invention.

Consequently, in another embodiment, the analysis can additionally or alternatively comprise another assessment in relation to the location information calculated from GPS data provided by the location determination unit. Referring to FIG. 16, the driving pattern monitoring module 270 is arranged to calculate (Step 426) a ground speed, speed over ground or travel speed using the location information recorded over a period of time and use the calculated ground speed in order to determine (Step 428) whether the current speed of the navigation apparatus 200 is within a predetermined speed range, for example between about 2 ms$^{-1}$ and about 7 ms$^{-1}$. However, this range is an example and a lower limit need not necessarily be specified. The speed calculated can therefore be compared with a maximum speed threshold, for example less than about 10 ms$^{-1}$ or about 7 ms$^{-1}$, such as about 3 ms$^{-1}$. If a minimum speed threshold is to be used, the minimum speed threshold can be at least about 1 ms$^{-1}$, for example at least about 2 ms$^{-1}$ as described above. The purpose of measuring the speed of the navigation apparatus 200 is in order to determine if the navigation apparatus 200 is being driven at a relatively slow speed associated with a driving behaviour indicative of a person searching for a parking facility. If the driving pattern monitoring module 270 determines that the travel speed of the navigation apparatus 200 is not within the predetermined speed range, then the driving pattern monitoring module 270 assumes (Step 422) that there is no need to offer assistance to navigate to the parking facility. Otherwise, the driving pattern monitoring module 270 assumes (Step 424) that assistance in identifying the parking facility and, optionally, navigating to the parking facility is possibly required.

In another embodiment (FIG. 17), the analysis (Step 412) performed and described above comprises analysing the direction of travel of the navigation apparatus 200. The direction of travel of the navigation apparatus 200 is analysed, because travel away from the destination location can be associated with a driving pattern behaviour indicative of the user or a driver searching for the parking facility, especially after the destination location has been reached. In this example, the driving pattern monitoring module 270 analyses the location information recorded over a period of time in order to calculate (Step 430) a direction of travel of the navigation apparatus 200 and hence the user. Once direction of travel has been calculated, the driving pattern monitoring module 270 determines (Step 432) from the current location or a flag previously set by the application software 266 whether the destination location has been reached. If the destination location is determined not to have been reached, then the driving pattern monitoring module 270 determines (Step 422) that there is no need to offer assistance to navigate to the parking facility. However, if the destination location has been reached and/or passed, then the driving pattern monitoring module 270 determines (Step 434) from the direction of travel of the navigation apparatus 200 calculated whether the navigation apparatus 200 is travelling away from the destination location. If the direction of travel is determined not to be a direction away from the destination location, then the driving pattern monitoring module 270 assumes (Step 422) that there is no need to offer assistance to navigate to the parking facility. Otherwise, the driving pattern monitoring module 270 assumes (Step 424) that assistance in identifying the parking facility and, optionally, navigating to the parking facility is possibly required.

In a further embodiment (FIG. 18), the analysis (Step 412) performed and described above comprises analysing a path travelled by the navigation apparatus 200. The travel path of the navigation apparatus 200 is analysed, because the travel path followed by the navigation apparatus 200 can be associated with a driving pattern behaviour indicative of the user or driver searching for the parking facility, especially after the destination location has been reached. In this example, the driving pattern monitoring module 270 determines (Step 436) from the current location or a flag previously set by the application software 266 whether the destination location has been reached. If the destination location is determined not to have been reached, then the driving pattern monitoring module 270 determines (Step 422) that there is no need to offer assistance to navigate to the parking facility. However, if the destination location has been passed and/or reached, then the driving pattern monitoring module 270 analyses (Step 438) the path travelled and determines (Step 440) if a correlation exists between the path travelled and a predetermined travel path form. In this respect, any suitable correlation technique can be employed in order to establish whether the correlation exists between the travel path followed and the predetermined path, for example a pattern matching algorithm employing a least squares technique. In relation to the correlation, a minimum degree of "goodness of fit" can be specified in advance, without which correlation is deemed not to exist. The predetermined path form can be a substantially loop-shaped path, for example a substantially circular, substantially triangular or substantially square-shaped path. The predetermined path can be a reverse course or so-called "back-track" path. If no or insufficient correlation is determined to exists between the path travelled and the predetermined path, then the driving pattern monitoring module 270 assumes (Step 422) that there is no need to offer assistance to navigate to the parking facility. Otherwise, the driving pattern monitoring module 270 assumes (Step 424) that assistance in identifying the parking facility and, optionally, navigating to the parking facility is possibly required. It should be appreciated that the above technique can require, if desired, more than one predetermined pattern forms to be recognised before assistance is assumed to be required.

In yet a further embodiment, the offer to provide assistance finding a parking facility can be initiated simply in response to the navigation apparatus 200 arriving at the destination selected.

In arriving at a determination that the user of the navigation apparatus 200 requires assistance in finding the parking facility, the driving pattern monitoring module 270 can employ one or more of the above-described techniques. Indeed, a series of the above-described techniques can be employed in a prescribed order.

Referring back to FIG. 5, once the driving pattern monitoring module 270 has determined (Step 415) that the driver of the vehicle might require assistance in finding the parking facility, the application software 266 searches (Step 416) the POI database 228 in order to find a parking facility within a predetermined vicinity from the location selected in the manner described above. In this respect, the predetermined vicinity is set to a radius of 1 km with respect to the location selected. However, if desired, the application software 266 can be configured to allow the user to specify the predetermined vicinity. In this example, the application software 266 therefore searches for parking facilities within 1 km of Rembrandtplein 35.

Figure 19:
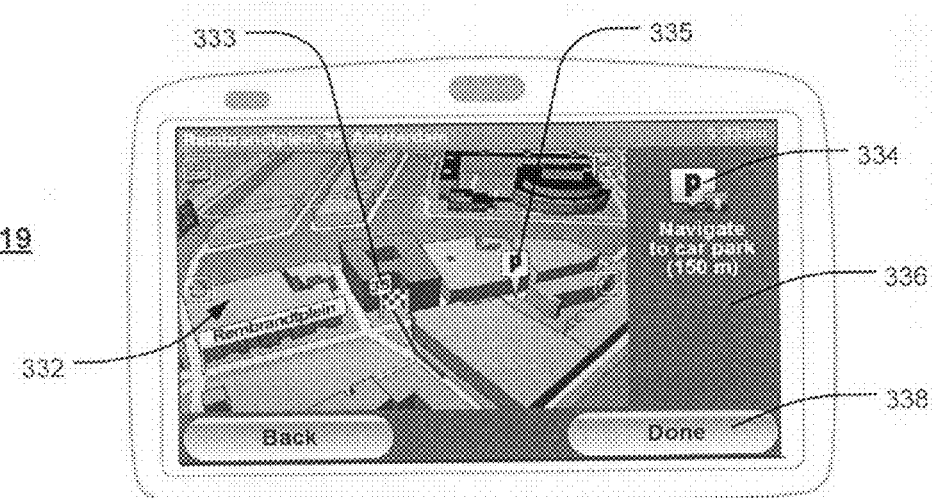
FIGS. 19 and 20 are further screen shots from the navigation apparatus of FIG. 2 during performance of the method of FIG. 5.

Referring to FIG. 19, in the event that a parking facility has been found by the application software 266 within the predetermined vicinity, the application software 266 generates a visual and/or audible message (Step 417) via the user interface in order to ask (Step 418) the user of the navigation apparatus 200 whether assistance is required in finding a parking facility. In the case of an audible message, the message can be generated using a so-called Text-To-Speech (US) processor. Where provision of an audible response is supported, the application software 266 can support Automatic Speech Recognition (ASR).

In the event that the application software 266 receives a negative response, the application software 266 takes no further action in respect of providing assistance finding the parking facility and the driving pattern monitoring module 270 continues to monitor location information in the manner described herein. However, in the event that the user of the navigation apparatus 200 responds positively, the application software 266 initiates (Step 419) a parking facility selection procedure and the view generation engine 268 of the application software 266 responsively renders a three-dimensional preview of the location selected 333 and the parking facility 335 found in a main display pane 332, and a virtual button 334, or other selectable element or icon, is displayed in a side pane 336. In this example, the three-dimensional view is a bird's eye view.

The virtual button 334 is an example of a user interface element and is selectable by the user. The virtual button 334 has a label: "Navigate to car park", and specifies in parenthesis a distance between the location selected and the parking facility, for example 150 m. The user is thus provided with a suggestion of a potentially suitable parking facility. The application software 266 monitors for "actuation" of the virtual button 334 and, in the event that the user touches the virtual button 334 in order to select the functionality of navigation to the parking facility, the view generation engine 268 renders another preview (FIG. 20) showing, in this example, the parking facility found as described above. The second preview is centred upon the parking facility, but a level of zoom used to generate the view is set so that the location selected (Rembrandtplein, 35) is also visible in the second preview.

In the event that the user does not wish to be navigated to the parking facility suggested, the user can simply touch a "Done button" 338 (FIG. 19). The application software 266 then takes no further action in respect of providing assistance finding the parking facility.

Figure 20:
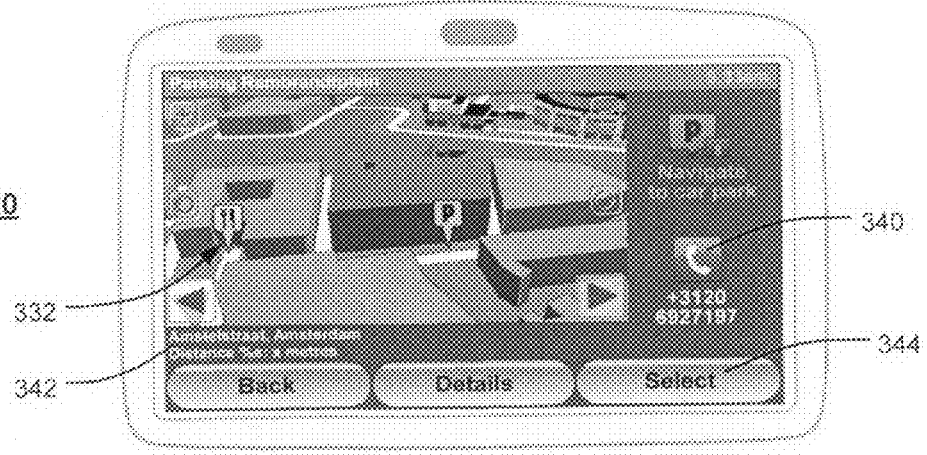

Referring to FIG. 20 and assuming that a parking facility has been found and selected by the user, once the second preview has been generated, the preview shows the parking facility in the main pane 332, the view being centred upon the parking facility. The preview generated also provides additional information concerning the parking facility, for example a telephone number, and an identity of the parking facility. In this example, the telephone number is shown as a selectable virtual button 340 that can be selected, "actuation" of the selectable virtual button 340 permitting automation of a voice call initiation process using a voice communications terminal, for example a cellular telephone handset, in communication with the navigation apparatus 200, or via cellular communications hardware, if present, incorporated in the navigation apparatus 200. The identity of the parking facility is set out in an area 342 beneath the main pane 332. In this example, the parking facility is identified as "Rembrandtplein—Bakkerstraat, Amsterdam". In addition, a measure is indicated in the area 342 beneath the main pane 332 in order to assist the user in deciding whether to select the parking facility suggested by the application software 266. The measure can be any appropriate measure relating to separation between the destination location and the parking facility, or separation between the current location of the navigation apparatus 200 and the parking facility that the user can find useful, for example distance, such as straight line distance, travel time, or arrival time. The label for the measure is identified as "Distance %s: x meters" in FIG. 20. In this example, the measure is estimated.

In the event that the user decides that navigation to the POI suggested is required, the user touches a "Select" virtual button 344 and the selection is detected by the application software 266 which responds by modifying the route being followed by replacing the selected destination with the location of the parking facility. If, however, the selected destination has been reached, the application software 266 initiates a route configuration procedure to set the location of the parking facility selected as a new destination. The application software 266 then calculates a new route from a current location of the location determination unit of the navigation apparatus 200 to the parking facility selected.

The navigation apparatus 200 then provides navigation assistance to the selected parking facility. In this respect, the navigation apparatus 200 guides the user, in a known manner, by updating the map in accordance with determined changes in location of the navigation apparatus 200, and by providing the user with visual and, optionally, audible navigation instructions until the destination, namely the parking facility selected, is reached.

In a further embodiment, where the parking facility is selected by the user, and a database or a list of "recent destinations" is maintained by the application software 266, the record of "recent destinations" can be updated with both the location originally selected and the POI selected.

In the embodiments described above, the application software 266 finds the closest parking facility to the location initially selected by the user that conforms to the predetermined vicinity criterion. However, the skilled person should appreciate that other parking facilities complying with the predetermined vicinity criterion can exist. In a further embodiment, the application software 266 can cause the view generation engine 268 to provide an interactive selection screen permitting the user to select one of a number of parking facilities found to comply with the predetermined vicinity criterion. In this respect, if the database 228 contains additional information concerning the parking facilities selected, the parking facilities identified can be sorted according to one or more sorting criteria, for example rating as best, cost, and/or user needs, for example good wheelchair access. The user is then at liberty to select one of the parking facilities, for example parking facilities, listed and the selected parking facilities can then be viewed as described above in relation the second preview generated and the parking facilities can then be selected as the new destination, rejected outright or rejected but providing the user with another opportunity to select another parking facilities, for example by means of a "Back" virtual button.

If desired, repeated requests to assist finding a parking facility can be avoided in relation to any of the above-described embodiments by the driving pattern monitoring module 270 recording when the user declines an offer of assistance finding a parking facility and then preventing generation of further offers of assistance to find parking facilities even though a characteristic of the location information is subsequently determined to be in accordance with a predetermined criterion.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, another criterion that can be assessed in order to determine whether a parking facility is being sought is whether the navigation apparatus 200 has failed to stop at the destination location for more than a predetermined period of time, for example at least 20 seconds. This assessment can be made alone or in combination with other techniques described herein, Although the above embodiments have largely been described in the context of pre-selecting a destination prior to departure, the above examples can be employed in relation to selecting a parking facility whilst en-route and following a route already calculated by the navigation apparatus 200. Likewise, the skilled person should appreciate that the above described techniques need not be employed exclusively during navigation to the destination location and the techniques described above can be modified for use when a driver is not receiving navigation assistance, i.e. a so-called "free driving" mode of operation is supported, by removing dependence of the techniques upon the destination location, where possible, so as to remain useful when determining whether the driver is seeking a parking facility.

Whilst embodiments described in the foregoing detailed description refer to GPS, it should be noted that the navigation apparatus may utilise any kind of position sensing technology as an alternative to (or indeed in addition to) GPS. For example the navigation apparatus may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation apparatus comprising:
   a location determination unit;
   a processing resource arranged to support, when in use, a user interface, the processing resource being operably coupled to the location determination unit in order to obtain location information therefrom; wherein
   the processing resource is arranged to monitor driving pattern by analysing the change in the location information with time; and
   the user interface is arranged to generate a message offering assistance in relation to finding a parking facility in response to the processing resource determining a driving pattern indicative of searching a parking utility.

2. An apparatus as claimed in claim 1, wherein the processing resource is arranged to support a navigation function, the navigation function being arranged to provide navigation assistance to a selected location.

3. An apparatus as claimed in claim 2, wherein the processing resource is arranged to query a database comprising parking facility information in order to find the parking facility, the parking facility being within a predetermined vicinity of the location selected.

4. An apparatus as claimed in claim 3, wherein the location selected is a destination location.

5. An apparatus as claimed in claim 3, wherein the location selected is a waypoint location.

6. An apparatus as claimed in claim 2, wherein the parking facility found is a closest parking facility with respect to the selected location.

7. An apparatus as claimed in claim 1, wherein the processing resource is arranged to support generation of the message when navigation assistance is not being provided.

8. An apparatus as claimed in claim 1, wherein the processing resource is arranged to query a database comprising parking facility information in order to find the parking facility, the parking facility being within a predetermined vicinity of a current location.

9. An apparatus as claimed in claim 1, wherein the user interface is arranged to await a response from a user following generation of the message, and the processing resource is arranged to record the response when the response is indicative of a declination of the offer of assistance for preventing the message being repeated.

10. An apparatus as claimed in claim 1, wherein:
    the processing resource is arranged to support a navigation function;
    the user interface is arranged to receive a user response to the message accepting the offer of assistance; and
    the processing resource is arranged to initiate a route configuration procedure in response to the user response.

11. A method of determination that a parking facility is being sought, the method comprising:
    obtaining location information from a location determination unit;
    monitoring driving pattern by analysing the change in the location information with time;
    determining whether the driving pattern is indicative of searching a parking utility; and
    a user interface generating a message offering assistance in relation to finding a parking facility in response to determining a driving pattern indicative of searching a parking utility.

12. A method of modifying a route being used by a navigation apparatus to provide navigation assistance, the method comprising the method of determining that a parking facility is being sought as claimed in claim 11.

13. A non-transitory computer readable medium comprising computer program code segments to cause, when executed, a computer to execute the method as claimed in claim 11.

14. An apparatus as claimed in claim 1, wherein monitoring driving pattern comprises measuring the speed of the apparatus, and determining a driving pattern indicative of searching a parking utility comprises determining whether the measured speed is within a predetermined speed range.

15. An apparatus as claimed in claim 1, wherein monitoring driving pattern comprises analysing the direction the apparatus travel.

16. An apparatus as claimed in claim 1, wherein monitoring driving pattern comprises analysing a path travelled by the navigation apparatus.

17. An apparatus as claimed in claim 2, wherein determining a driving pattern indicative of searching a parking utility comprises determining whether the apparatus is within a proximity threshold with respect to the location selected.

18. An apparatus as claimed in claim 2, wherein determining a driving pattern indicative of searching a parking utility comprises determining whether the apparatus fails to stop at the selected location for a minimum predetermined period of time.

19. An apparatus as claimed in claim 2, wherein determining a driving pattern indicative of searching a parking utility comprises determining whether the apparatus is travelling away from the selected location.

20. An apparatus as claimed in claim 2, wherein the determination of a driving pattern indicative of searching a parking utility is made upon or after arrival at the selected location.

21. An apparatus as claimed in claim 1, wherein determining a driving pattern indicative of searching a parking utility comprises correlating a path being travelled to a predetermined path, the predetermined path being one of: a substantially loop-shaped path, a substantially circular path, a substantially triangular path, a substantially square-shaped path and a reversed course.

22. An apparatus as claimed in claim 1, wherein the message offering assistance in relation to finding a parking facility indicates a distance to the parking facility.

23. An apparatus as claimed in claim 2, wherein the navigation function modifies a route to the selected location by replacing the selected location with the parking facility upon an indication that a parking facility is desired.

24. An apparatus as claimed in claim 1, wherein the message offering assistance in relation to finding a parking facility is provided when the apparatus is in a free driving mode of operation.

\* \* \* \* \*